No. 638,663. Patented Dec. 5, 1899.
J. ELLIS.
FILTER.
(Application filed Nov. 22, 1898.)

(No Model.)

WITNESSES:
Florence J. Garrett.
John L. Roscor

INVENTOR:
John Ellis,
Per Edwin W. Brown,
ATT'Y

UNITED STATES PATENT OFFICE.

JOHN ELLIS, OF LYNN, MASSACHUSETTS.

FILTER.

SPECIFICATION forming part of Letters Patent No. 638,663, dated December 5, 1899.

Application filed November 22, 1898. Serial No. 697,164. (No model.)

*To all whom it may concern:*

Be it known that I, JOHN ELLIS, of Lynn, in the county of Essex and State of Massachusetts, have invented certain new and useful Improvements in Filters, of which the following is a full, clear, and exact description.

This invention relates to a filter, more especially intended for the filtering of water, which is very simple in its construction, can be made at a very small cost, and yet is as practical and satisfactory in its operation as a more expensive filter; and the invention consists of a filter for filtering water and other liquids, all constructed substantially as hereinafter fully described, reference being had to the accompanying sheet of drawings, in which—

Figure 1:
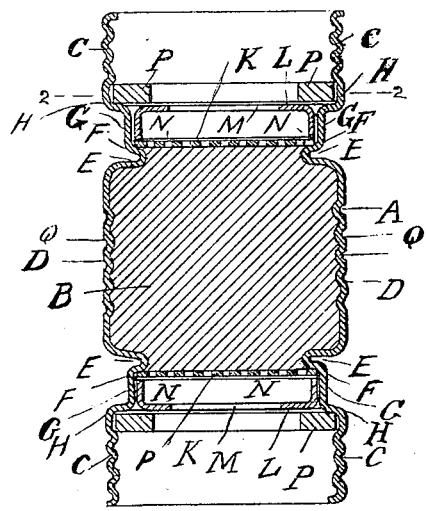
Figure 2:
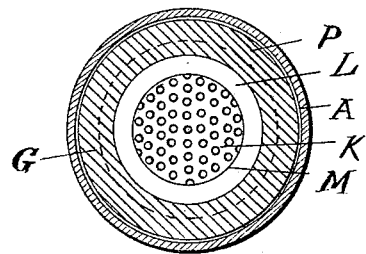

Figure 1 is a central vertical section of the filter, and Fig. 2 is a cross-section on line 2 2, Fig. 1.

In the drawings, A represents a casing inclosing the filtering material B and other parts of the filter and having an external screw-thread C on each end. This casing is made of one piece from a plain straight tube and is formed into the shape and outline shown by spinning it into such form. It is spun to leave central portion D straight and forced radially inward to make a partial closing of the case at E, forming an internal shoulder F, from which the sides continue in a straight portion G and forming another shoulder H of larger diameter and the outside at each end having the screw-thread C formed thereon. Both ends of the casing from the central portion are made alike, as shown.

Placed within the casing, resting on the shoulder F, is a perforated plate K, and resting or bearing against this perforated plate K is a cup-shaped piece L, having a central hole or opening through it, the edge N of the cut resting against the perforated plate K, and against the outer side of this ring-cup L is placed a flat ring P, of elastic material, such as india-rubber, resting against the shoulder H and which is of a diameter preferably a little larger than the internal diameter of the casing at such place, so that when pressed into its seat or shoulder it will fit closely and firmly therein to hold the perforated plate and cup-shaped ring in place.

The central portion of the filter-case between the two perforated plates is filled with the filtering material B, which can be of any suitable material for such purpose.

The filter being constructed the same at each end is as usual in filters.

At the central portion D the casing is circumferentially grooved, somewhat as at Q, to provide a roughened surface for a better hold upon the filter in screwing it on or off the water-faucet or other holder.

By spinning up the casing into the shape and with the shoulder and screw-threads formed thereon as described the casing can be made of one piece and at a very small cost. The cup-shaped ring gives a small chamber between it and the perforated plate and having a smaller hole or opening through it the stream of water as it passes through is caused to run in a smooth and steady stream.

Having thus described my invention, what I claim is—

1. A filter-casing spun up from a tube, provided with internal shoulders F H and an external screw-thread on the end.

2. A filter, consisting of a casing A having an external screw-thread on its end, shoulders F and H, a perforated plate against the shoulder F a cup-shaped ring resting by its edges against the perforated plate and an elastic ring next the cup-shaped ring and bearing on the shoulder H.

In testimony whereof I have hereunto set my hand in the presence of two subscribing witnesses.

JOHN ELLIS.

Witnesses:
EDWIN W. BROWN,
ARTHUR P. GOLDTHWAIT.